(12) United States Patent
Jiang et al.

(10) Patent No.: US 11,960,087 B2
(45) Date of Patent: Apr. 16, 2024

(54) OPTICAL DEVICE AND DISPLAY APPARATUS WITH SAME IMAGES FOR LEFT AND RIGHT EYES

(71) Applicant: SHENZHEN OPTIARK SEMICONDUCTOR TECHNOLOGIES LIMITED, Shenzhen (CN)

(72) Inventors: Houqiang Jiang, Shenzhen (CN); Yisheng Zhu, Shenzhen (CN)

(73) Assignee: SHENZHEN OPTIARK SEMICONDUCTOR TECHNOLOGIES LIMITED, Shenzhen (CN)

( * ) Notice: Subject to any disclaimer, the term of this patent is extended or adjusted under 35 U.S.C. 154(b) by 214 days.

(21) Appl. No.: 17/533,008

(22) Filed: Nov. 22, 2021

(65) Prior Publication Data

US 2022/0382057 A1 Dec. 1, 2022

(30) Foreign Application Priority Data

May 25, 2021 (CN) .......................... 202110569358.6

(51) Int. Cl.
*G02B 27/01* (2006.01)
*F21V 8/00* (2006.01)
*G02B 27/00* (2006.01)
*G02B 27/42* (2006.01)

(52) U.S. Cl.
CPC ......... *G02B 27/0172* (2013.01); *G02B 6/005* (2013.01); *G02B 27/0081* (2013.01); *G02B 27/4205* (2013.01); *G02B 2027/0178* (2013.01)

(58) Field of Classification Search
CPC ...... G02B 6/005; G02B 6/0016; G02B 6/002; G02B 6/0038; G02B 6/10; G02B 27/0081; G02B 27/4205; G02B 27/4272; G02B 27/0172; G02B 2027/0178;
(Continued)

(56) References Cited

U.S. PATENT DOCUMENTS 4,946,253 A * 8/1990 Kostuck ............. G02B 27/4261
359/638
6,580,529 B1 * 6/2003 Amitai ............... G02B 27/0944
359/13

(Continued)

*Primary Examiner* — Andrew Jordan
(74) *Attorney, Agent, or Firm* — Nitin Kaushik

(57) ABSTRACT

An optical device comprises a waveguide plate comprising an entrance pupil grating unit, a left pupil-expanding grating unit, and a right pupil-expanding grating unit. The left and right pupil-expanding grating units are bilaterally symmetric, and left and right exit pupil grating units are bilaterally symmetric. An input light is diffracted by the entrance pupil grating unit to form a first left guided light and a first right guided light, the first left guided light is diffracted by the left pupil-expanding grating unit to form a second left guided light, and the first right guided light is diffracted by the right pupil-expanding grating unit to form a second right guided light. The second left guided light is diffracted by the left pupil-expanding grating unit to form a left output light, and the second right guided light is diffracted by the right pupil-expanding grating unit to form a right output light.

11 Claims, 5 Drawing Sheets

(58) Field of Classification Search
CPC .... G02B 2027/0123; G02B 2027/0132; G02B 5/1819
See application file for complete search history.

(56) References Cited

U.S. PATENT DOCUMENTS

| | | | | |
|---|---|---|---|---|
| 6,833,955 B2 * | 12/2004 | Niv | .......................... | G02B 5/32 359/566 |
| 7,764,413 B2 * | 7/2010 | Levola | ............... | G02B 27/0081 359/13 |
| 8,160,411 B2 * | 4/2012 | Levola | ............... | G02B 27/0172 359/569 |
| 8,314,993 B2 * | 11/2012 | Levola | ............... | G02B 6/0016 359/569 |
| 8,320,032 B2 * | 11/2012 | Levola | ............... | G02B 27/0081 359/13 |
| 8,508,848 B2 * | 8/2013 | Saarikko | ............ | G02B 5/1814 359/567 |
| 9,298,168 B2 * | 3/2016 | Taff | ...................... | G04G 9/0035 |
| 9,372,347 B1 * | 6/2016 | Levola | ................ | G02B 5/1842 |
| 9,535,253 B2 * | 1/2017 | Levola | ............... | G02B 27/0081 |
| 9,791,703 B1 * | 10/2017 | Vallius | .................. | G02B 6/005 |
| 9,939,647 B2 * | 4/2018 | Vallius | ................ | G02B 27/0081 |
| 10,018,844 B2 * | 7/2018 | Levola | .................... | G02B 6/00 |
| 10,067,347 B2 * | 9/2018 | Vallius | ................ | G02B 6/0016 |
| 10,281,726 B2 * | 5/2019 | Vallius | ................ | G02B 6/0033 |
| 10,295,723 B1 * | 5/2019 | Lee | ...................... | G02B 6/0065 |
| 10,393,930 B2 * | 8/2019 | Tervo | ...................... | G02B 5/18 |
| 10,473,841 B2 * | 11/2019 | Danziger | ............ | G02B 6/0016 |
| 10,509,158 B2 * | 12/2019 | Lee | ...................... | G02B 6/0038 |
| 10,527,853 B2 * | 1/2020 | Kimmel | ............... | G02B 5/1866 |
| 10,545,346 B2 * | 1/2020 | Waldern | ............. | G02B 27/0093 |
| 10,546,523 B2 * | 1/2020 | Bohn | .................... | G02B 6/005 |
| 10,746,989 B2 * | 8/2020 | Brown | ............. | G02B 27/0081 |
| 10,782,458 B2 * | 9/2020 | Tervo | ............... | G02B 27/0172 |
| 10,816,798 B2 * | 10/2020 | Travers | ............... | G02B 27/017 |
| 10,859,768 B2 * | 12/2020 | Popovich | .................. | G02B 6/34 |
| 10,878,235 B2 * | 12/2020 | Jarvenpaa | ............ | G06V 40/19 |
| 10,935,730 B1 * | 3/2021 | Lou | ................ | G02B 27/0172 |
| 10,962,787 B1 * | 3/2021 | Lou | ................ | G02B 27/0081 |
| 10,969,585 B2 * | 4/2021 | Tervo | ................ | G02B 27/4205 |
| 11,119,262 B1 * | 9/2021 | Levola | ............... | G02B 27/0081 |
| 11,175,511 B2 * | 11/2021 | Chi | ...................... | H04N 9/3152 |
| 11,194,162 B2 * | 12/2021 | Waldern | ............ | G02B 27/0093 |
| 11,199,713 B2 * | 12/2021 | Kimmel | ............... | G02B 27/0081 |
| 11,204,462 B2 * | 12/2021 | Klug | ...................... | G02B 6/122 |
| 11,281,013 B2 * | 3/2022 | Popovich | ............. | G02B 6/0016 |
| 11,340,389 B2 * | 5/2022 | Toyama | ................ | G02B 5/1819 |
| 11,347,960 B2 * | 5/2022 | Jarvenpaa | .......... | G02B 27/0093 |
| 11,353,705 B2 * | 6/2022 | Choi | ................... | G02B 27/0176 |
| 11,391,943 B2 * | 7/2022 | Olkkonen | .......... | G02B 27/0081 |
| 11,480,722 B2 * | 10/2022 | Jiang | .................... | G02B 6/0038 |
| 11,586,046 B2 * | 2/2023 | Waldern | ................ | G06F 3/0433 |
| 11,650,423 B2 * | 5/2023 | Messer | ................ | G02B 6/0076 359/630 |
| 2003/0067685 A1 * | 4/2003 | Niv | ...................... | G02B 27/0081 359/566 |
| 2006/0126181 A1 * | 6/2006 | Levola | ............... | G02B 27/0081 359/567 |
| 2006/0126182 A1 * | 6/2006 | Levola | ............... | G02B 27/0081 359/569 |
| 2006/0221448 A1 * | 10/2006 | Nivon | .................. | G02B 6/0076 359/566 |
| 2009/0097122 A1 * | 4/2009 | Niv | .......................... | G02B 5/32 359/558 |
| 2009/0128911 A1 * | 5/2009 | Itzkovitch | .......... | G02B 27/0172 359/575 |
| 2010/0232016 A1 * | 9/2010 | Landa | .................. | G02B 5/1814 359/466 |
| 2010/0296163 A1 * | 11/2010 | Saarikko | ............... | G02B 5/1814 359/569 |
| 2013/0271838 A1 * | 10/2013 | Iizuka | .................... | G02B 6/124 359/572 |
| 2016/0231570 A1 * | 8/2016 | Levola | ................ | G02B 6/0035 |
| 2016/0320536 A1 * | 11/2016 | Simmonds | .......... | G02B 5/1823 |
| 2016/0327705 A1 * | 11/2016 | Simmonds | ........ | G02B 27/0172 |
| 2017/0299864 A1 * | 10/2017 | Vallius | ............... | G02B 27/0081 |
| 2018/0284440 A1 * | 10/2018 | Popovich | ........... | G02B 27/0172 |
| 2019/0004219 A1 * | 1/2019 | Tervo | ...................... | G02B 5/18 |
| 2019/0004324 A1 * | 1/2019 | Wang | ................ | G02F 1/133602 |
| 2019/0121027 A1 * | 4/2019 | Popovich | ............. | G02B 6/2726 |
| 2019/0339436 A1 * | 11/2019 | Lee | ................ | G02B 5/1823 |
| 2019/0361156 A1 * | 11/2019 | Tervo | ................ | G02B 5/1842 |
| 2020/0073030 A1 * | 3/2020 | Toyama | ................ | G02B 5/1866 |
| 2020/0081246 A1 * | 3/2020 | Olkkonen | .......... | G02B 27/4272 |
| 2020/0142109 A1 * | 5/2020 | Olkkonen | ............ | G02B 5/1842 |
| 2020/0150322 A1 * | 5/2020 | Lin | ................... | G02B 6/005 |
| 2020/0257120 A1 * | 8/2020 | Genier | ............ | G02B 27/0172 |
| 2021/0055553 A1 * | 2/2021 | Chi | ...................... | H04N 9/3152 |
| 2021/0080629 A1 * | 3/2021 | Tsai | ................ | G02B 27/0944 |
| 2021/0109273 A1 * | 4/2021 | Jiang | ................... | G02B 6/0038 |
| 2021/0239984 A1 * | 8/2021 | Popovich | ............. | G02B 5/1866 |
| 2022/0196895 A1 * | 6/2022 | Monpeurt | ........... | G01N 21/552 |
| 2022/0382057 A1 * | 12/2022 | Jiang | ...................... | G02B 6/002 |
| 2022/0413194 A1 * | 12/2022 | Lu | ........................ | G02B 5/1819 |

* cited by examiner

OPTICAL DEVICE AND DISPLAY APPARATUS WITH SAME IMAGES FOR LEFT AND RIGHT EYES

TECHNICAL FIELD

The present invention belongs to the field of waveguide technology, and particularly relates to an optical device and a display apparatus.

RELATED ART

Near-eye display technology is one of the essential technologies that must be used in current AR (Augmented Reality) glasses. A near-eye display system generally comprises an image source and an optical transmission system, wherein images sent by the image source is transmitted to human' eyes through the optical transmission system. A certain transmittance is required by the optical transmission system, so that wearers may see environment, in addition to virtual images.

There are many solutions for the optical transmission system, such as free space optics, free surface optics, and display optical waveguides. Among them, optical waveguide technology, due to its large eye-box and thin and light characteristics, is obviously better than other optical solutions, thus becoming the mainstream path for main companies. However, optical waveguides currently can only realize monocular display instead of binocular display, due to the problems of high hardware cost and high power consumption.

SUMMARY

An optical device and a display apparatus are provided in the present disclosure to solve the problem that the current optical waveguides can only realize monocular display.

To solve the above technology problem, the present disclosure provides an optical device comprising a waveguide plate, wherein the waveguide plate comprises: an entrance pupil grating unit, wherein input light is diffracted by the entrance pupil grating unit to form a first left guided light and a first right guided light; a left pupil-expanding grating unit, located on the left side of the entrance pupil grating unit, wherein the first left guided light is diffracted by the left pupil-expanding grating unit to form a second left guided light; a right pupil-expanding grating unit, located on the right side of the entrance pupil grating unit, wherein the first right guided light is diffracted by the right pupil-expanding grating unit to form a second right guided light; a left exit pupil grating unit, located below the left pupil-expanding grating unit, wherein the second left guided light is diffracted by the left exit pupil grating unit to form a left output light; a right exit pupil grating unit, located below the right pupil-expanding grating unit, wherein the second right guided light is diffracted by the right exit pupil grating unit to form a right output light, wherein the left pupil-expanding grating unit and right pupil-expanding grating unit are bilaterally symmetric about the entrance pupil grating unit, the left exit pupil grating unit and the right exit pupil grating unit are bilaterally symmetric about the entrance pupil grating unit, and the input light, the left output light, and the right output light are in the same direction.

In an embodiment, the entrance pupil grating unit is a surface grating or a holographic grating, the shape of the entrance pupil grating unit is a circle with a diameter in the range of 2.5 mm to 7 mm, and a grating period of the entrance pupil grating unit is in the range of 330 nm to 450 mm.

In an embodiment, the left pupil-expanding grating unit and the right pupil-expanding grating unit are in pupil-expanding grating structure, a height of the pupil-expanding grating structure in a vertical direction gradually increases in a direction horizontally away from the entrance pupil grating unit, the maximum height of the pupil-expanding grating structure in the vertical direction is 2 to 5 times of a diameter of the entrance pupil grating unit, and a width of the pupil-expanding grating structure in a horizontal direction is 5 to 10 times of the diameter of the entrance pupil grating unit.

In an embodiment, the pupil-expanding grating structure is divided into 5 to 15 pupil-expanding sub-regions, an angle between a boundary of the adjacent pupil-expanding sub-regions and the horizontal direction is 20 to 160 degrees, a diffraction efficiency of each pupil-expanding sub-region gradually increases in a direction away from the entrance pupil grating unit, and the diffraction efficiency of each pupil-expanding sub-region is 5% to 95%.

In an embodiment, the left exit pupil grating unit and the exit pupil grating unit are in pupil-exiting grating structure, the pupil-exiting grating structure is a rectangle, a height of the pupil-exiting grating structure in the vertical direction is 3 to 6 times of the diameter of the entrance pupil grating unit, and a width of the pupil-exiting grating structure in the horizontal direction is 80% to 95% of the width of the pupil-expanding grating structure.

In an embodiment, the pupil-exiting grating structure is divided into 5 to 15 pupil-exiting sub-regions, a diffraction efficiency of each pupil-exiting sub-region gradually increases in a direction vertically away from the entrance pupil grating unit, and the diffraction efficiency of each pupil-exiting sub-region is 5% to 95%.

In an embodiment, the pupil-expanding grating structure is a quadrilateral, four corners of the pupil-expanding grating structure and four corners of the pupil-exiting grating structure are all filleted, and a radius of curvature thereof is 0 mm to 20 mm.

In an embodiment, a horizontal distance from a center of the left exit pupil grating unit to a center of the right exit pupil grating unit is a pupillary distance of human's eyes, and the pupillary distance is 60 mm to 70 mm, and a vertical distance from a center of the entrance pupil grating unit and a center of the left exit pupil grating unit is 8 mm to 25 mm.

In an embodiment, taking a direction from left to right as the reference, a direction of a grating vector of the entrance pupil grating unit is −1 to 1 degree, a direction of a grating vector of the left pupil-expanding grating unit is 30 to 60 degrees, a direction of a grating vector of the right pupil-expanding grating unit is 120 to 150 degrees, a direction of a grating vector of the left exit pupil grating unit is 88 to 92 degrees, and a direction of a grating vector of the right exit pupil grating unit is 88 to 92 degrees.

In an embodiment, wave vector regions of the left output light, the right output light, and the input light overlap in a wave vector space, wave vector regions of the first left guided light the first right guided light, the second left guided light and the second right guided light are located between a minimum wave vector of total internal reflection and a maximum wave vector of total internal reflection of the waveguide plate, and the wave vector regions of the second left guided light and the second right guided light overlap.

In an embodiment, when the grating vector of the entrance pupil grating unit is in a left direction, a sum of the grating vectors of the entrance pupil grating unit, the left pupil-expanding grating unit, and the left exit pupil grating unit is zero; when the grating vector of the entrance pupil grating unit is in a right direction, a sum of grating vectors of the entrance pupil grating unit, the right pupil-expanding grating unit and the right exit pupil grating unit is zero.

To solve the technology problem, the present disclosure provides a display apparatus comprising an optical engine and the above optical device, wherein the optical engine provides the input light.

Distinct from the current technology, the entrance pupil grating unit is arranged on the waveguide plate of the optical device in the present disclosure, the input light is diffracted by positive and negative orders of diffraction into the left and right guided lights, and the bilaterally symmetric pupil-expanding grating units and the bilaterally symmetric exit pupil grating units are formed on the same waveguide plate, which can realize binocular display. Since the waveguide plate is a whole body with basic flatness, the left and right eyes can achieve binocular fusion without other additional adjustments. Due to the overall left-right symmetry, colors complementary in the images of the left and right eyes can be achieved, thereby achieving a better color uniformity and a larger field of vision (FOV). The color uniformity can be further improved through the divisions of the left and right pupil-expanding grating units and the left and right exit pupil grating units. Simultaneously, both the positive and negative orders of diffraction are used, which can greatly improve the utilization rate of light energy in the system. As a consequence, the power consumption of the binocular system is much lower than that of the conventional binocular display solution.

BRIEF DESCRIPTION OF THE DRAWINGS

In the following examples, several variations will be described in more detail with reference to the appended drawings. The above and other objects, features, and advantages of the exemplary embodiments of the present disclosure will become easy to understand. In the drawings, several embodiments of the present disclosure are shown in an exemplary but not restrictive manner, and the same or corresponding reference numerals indicate the same or corresponding parts, in which.

DETAILED DESCRIPTION OF PREFERRED EMBODIMENTS

The technical solutions in the embodiments of the present disclosure will be clearly and completely described below in conjunction with the accompanying drawings in the embodiments of the present disclosure. Obviously, the described embodiments are a part of the embodiments of the present disclosure, but not all of the embodiments. Based on the embodiments in the present disclosure, all other embodiments obtained by those skilled in the art without creative work shall fall within the protection scope of the present disclosure.

The specific embodiments of the present application will be described in detail below with reference to the accompanying drawings.

Figure 1:
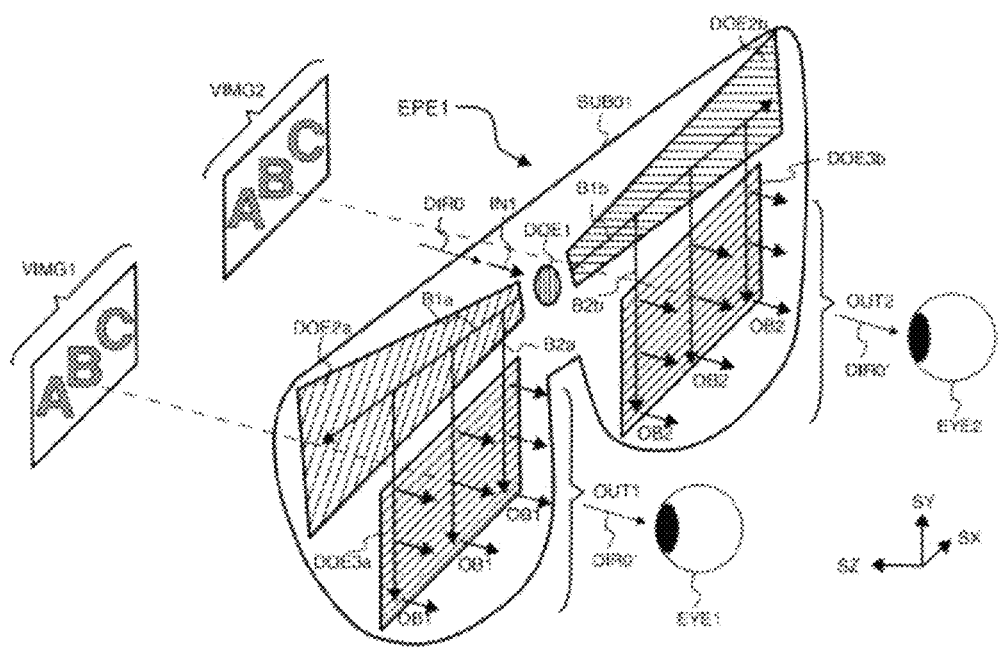
FIG. 1 is a schematic structural view of an optical device according to an embodiment of the present disclosure.

Referring to FIG. 1, an optical device EPE1 comprises a waveguide plate SUB01. The waveguide plate SUB01 may be a plane with adequate flatness, while a shape of the waveguide plate SUB01 may be a plate or a bending plate that fits for human face, both with adequate flatness.

The waveguide plate SUB01 comprises an entrance pupil grating unit DOE1, a left pupil-expanding grating unit DOE2a, a right pupil-expanding grating unit DOE2b, a left exit pupil grating unit DOE3a, and a right exit pupil grating unit DOE3b.

The entrance pupil grating unit DOE1 can receive an input light IN1, while the left exit pupil grating unit DOE3a and the right exit pupil grating unit DOE3b can provide an expended output light beam OUT1 and an expended output light beam OUT2, respectively. Under the action of the left pupil-expanding grating unit DOE2a, the right pupil-expanding grating unit DOE2b, together with the left exit pupil grating unit DOE3a and the right exit pupil grating unit DOE3b, the length and width of the output light beam OUT1 and the output light beam OUT2 are larger than the length and width of the input light INT1, thereby realizing pupil expansion.

The optical device EPE1 can expand the input light IN1 in two dimensions (e.g. in a horizontal direction SX and in a vertical direction SY). The expansion process may also be called as exit pupil expansion, the light expansion, etc. The optical device EPE1 can be called as a beam-expander device or an exit pupil expander, etc.

The entrance pupil grating unit DOE1 can be used as an in-coupling unit. The entrance pupil grating unit DOE1 can form a first guided light B1a and a second guided light B1b by diffracting the input light IN1. The input light IN1 can be incident from a front of the optical device EPE1 or from a back of the optical device EPE1. The first guided light B1a and the second guided light B1b may be propagated within the planar waveguide plate SUB1, and main directions of their propagation are symmetrical. The first guided light B1a and the second guided light B1b may be confined to the planar waveguide plate SUB1 for total internal reflection.

The term "guided" may mean that the light is propagated within the planar waveguide plate SUB1 and the light is confined within the plate by the total internal reflection (TIR). The term "guided" is the same as the term "optical waveguided".

The left pupil-expanding grating unit DOE2a is used to receive the first left guided light B1a and form a second left guided light B2a by diffraction. The left pupil-expanding grating unit DOE2a can almost evenly distribute the left second guided light B2a to the left exit pupil grating unit DOE3a, so that a beam width of the second left guided light B2a is greatly larger than a beam width of the first left guided light B1a. The second left guided light B2a is confined to propagate within the waveguide plate SUB01 by total internal reflection.

The right pupil-expanding grating unit DOE2b is used to receive the first right guided light B1a and form a second right guided light B2b by diffraction. The right pupil-expanding grating unit DOE2b can almost evenly distribute the right second guided light B2b to the right exit pupil grating unit DOE3b, so that a beam width of the second right guided light B2b is greatly larger than a beam width of the first right guided light B1b. The second right guided light B2b is confined to propagate within the waveguide plate SUB01 by total internal reflection.

The direction of the first left guided light B1a is bilaterally symmetric with the direction of the first right guided light B1b, and the main direction of the second left guided light B2a is the same as that of the second right guided light B2b.

The left exit pupil grating unit DOE3a can diffract the expanded guided light B2a to form a left output light OB1. The left output light OB1 is further expended in Y direction and maintained good uniformity, forming the left output light beam OUT1 as a whole. The direction of the left output light OB1 and the left output light beam OUT1 is called as DIR0'.

The right exit pupil grating unit DOE3b can diffract the expanded guided light B2b to form a right output light OB2. The right output light OB2 is further expended in Y direction and maintained good uniformity, forming the right output light beam OUT2 as a whole. The direction of the right output light OB2 and the right output light beam OUT2 is also called as DIR0'.

The direction DIR0 of the incident light beam IN1 is remained the same with the direction DIR0' of the left output light beam OUT1 and the right output light beam OUT2, and this relationship keeps no matter how the direction of the incident light beam IN1 changes. Since the direction of the left output light beam OUT1 is the same as the direction of the right output light beam OUT2, a virtual image VIMG1 received by left eye EYE1 and a virtual image VIMG2 received by right eye EYE2 can be blended together naturally without angle deviation, and the virtual image VIMG2 and virtual image VIMG2 are exactly the same.

SX, SY and SZ denote orthogonal directions. The waveguide plate SUB1 is parallel to a plane defined by the directions of SX and SY.

Figure 2:
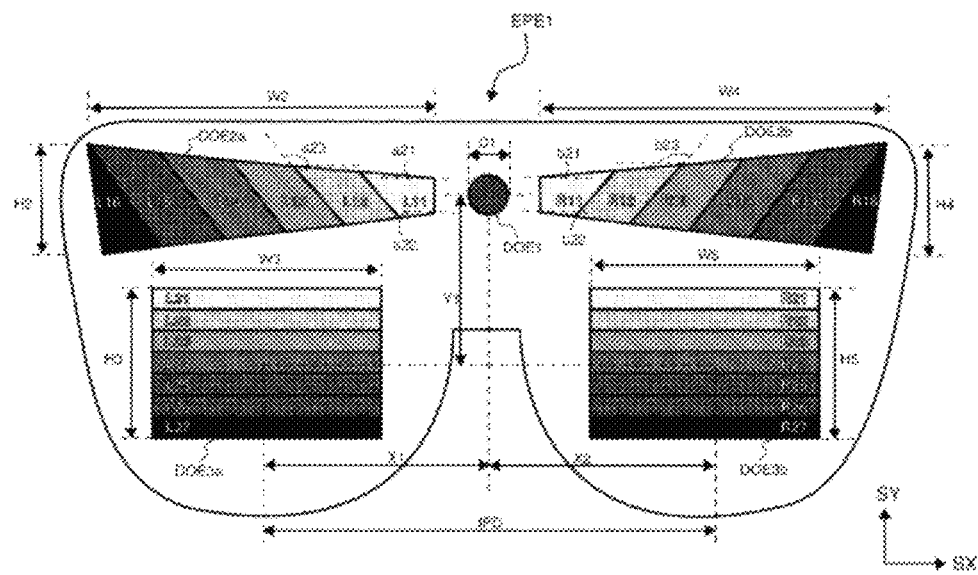
FIG. 2 is a schematic view of sub-regions of grating units of the optical device according to the embodiment in FIG. 1.

FIG. 2 shows sub-regions and their sizes of different grating regions of the optical device EPE1. A diameter of the entrance pupil grating unit DOE1 is D1, which ranges from 2.5 mm to 7 mm. The entrance pupil grating unit DOE1 is a surface grating or a holographic grating which has a high diffraction efficiency, and can transmit energy in left and right directions as the first left guided light B1a and the first right guided light B1b.

The left pupil-expanding grating unit DOE2a is a quadrilateral with a maximum width of W2, a maximum height of H2, and the highest left side, wherein the width W2 is 5 to 10 times of the diameter D1 and the height H2 is 2 to 5 times of the diameter D1. Angles between upper/lower side of the quadrilateral and the horizontal direction are a21 and a22, respectively. The left pupil-expanding grating unit DOE2a needs to be divided into 5 to 15 pupil-expanding sub-regions. Taking 6 sub-regions as an example, the left pupil-expanding grating unit DOE2a comprises sub-regions L11, L12, L13, L14, L15, and L16, wherein angles a23 between the boundaries of adjacent pupil-expanding sub-regions and the horizontal direction is 20 to 160 degrees, and the angles at the boundaries of different adjacent sub-regions may be different, thus to realize a better uniformity. In addition, the grating period can be fixed in different sub-regions, and the shape features, depths, duty ratios, or exposure conditions of the grating can be controlled, so that the diffraction efficiency of the different sub-regions may gradually increase. That is, when i is greater than j, the diffraction efficiency of the sub-region L1i is greater than the diffraction efficiency of the sub-region L1j, and a range of the diffraction efficiency of all corresponding sub-regions may be configured as 5% to 95%.

The right pupil-expanding grating unit DOE2b is a quadrilateral with a maximum width of W4, a maximum height of H4, and a highest right side, wherein the width W4 is 5 to 10 times of the diameter D1 and the height H4 is 2 to 5 times of the diameter D1. Angles between upper/lower side of the quadrilateral and the horizontal direction are b21 and b22, respectively. The right pupil-expanding grating unit DOE2b needs to be divided into 5 to 15 pupil-expanding sub-regions. Taking 6 sub-regions as an example, the right pupil-expanding grating unit DOE2b comprises sub-regions R11, R12, R13, R14, R15, and R16, wherein the angles b23 between the boundaries of adjacent pupil-expanding sub-regions and the horizontal direction is 20 to 160 degrees, the angles at the boundaries of different adjacent sub-regions may be different, thus to realize a better uniformity. In addition, the grating periods can be fixed in different sub-regions, and the shape features, depths, duty ratios, or exposure conditions of the gratings can be controlled, so that the diffraction efficiency of the different sub-regions may gradually increase. That is, when i is greater than j, the diffraction efficiency of sub-region R1i is greater than the diffraction efficiency of sub-region R1j, and a range of the diffraction efficiency of all corresponding sub-regions may be configured as 5% to 95%.

The left pupil-expanding grating unit DOE2a and the right pupil-expanding grating unit DOE2b have the same pupil-expanding grating structure GL GR, in which the structure sizes, grating parameters, sub-region features are bilaterally symmetric, and the diffraction efficiency of each sub-region is same, that is, L1i=R1i.

The left exit pupil grating unit DOE3a is a quadrilateral with a width of W3 and a height of H3, wherein the width W3 may be 80% to 95% of the width W2, and the height H3 may be 3 to 6 times of the diameter D1. The exit pupil grating unit DOE3a needs to be divided into 5 to 15 pupil-exiting sub-regions. Taking 7 sub-regions as an example, the left exit pupil grating unit DOE3a comprises sub-regions L21, L22, L23, L24, L25, L26, and L27, thereby realizing a better uniformity. In addition, the grating periods can be fixed in different sub-regions, and the shape features, depths, duty ratios, or exposure conditions of the gratings can be controlled, so that the diffraction efficiency of the different sub-regions may gradually increase. That is, when i is greater than j, the diffraction efficiency of the sub-region L2i is greater than the diffraction efficiency of the sub-region L2j, and a range of the diffraction efficiency of all corresponding sub-regions may be configured as 5% to 95%.

The right exit pupil grating unit DOE3b is a quadrilateral with a width of W5 and a height of H5, wherein the width W5 may be 80% to 95% of the width W4, and the height H5 may be 3 to 6 times of the diameter D1. The right exit pupil grating unit DOE3b needs to be divided into 5 to 15 pupil-exiting sub-regions. Taking 7 sub-regions as an example, the right exit pupil grating unit DOE3a comprises sub-regions R21, R22, R23, R24, R25, R26, and R27, thereby realizing a better uniformity. In addition, the grating periods can be fixed in different sub-regions, and the shape features, depths, duty ratios, or exposure conditions of the gratings can be controlled, so that the diffraction efficiency of the different sub-regions may gradually increase. That is, when i is greater than j, the diffraction efficiency of the sub-region R2i is greater than the diffraction efficiency of the sub-region R2j, and a range of the diffraction efficiency of all corresponding sub-regions may be configured as 5% to 95%.

The left exit pupil grating unit DOE3a and the right exit pupil grating unit DOE3b have the same pupil-exiting grating structure, in which the structure sizes, grating parameters, sub-region features must be strictly bilaterally symmetric, and diffraction efficiency of each sub-region must be the same, that is, L2i=R2i.

A distance between a center of the left exit pupil grating unit DOE3a and a center of the exit pupil grating unit DOE3b is a pupillary distance IPD, which is set as 60 mm to 70 mm, wherein a left half distance X1 equals to a right half distance X2, X1+X2=IPD. A vertical distance between a center of the entrance pupil grating unit DOE1 and a center of the left exit pupil grating unit DOE3a is Y1, which is set as 8 mm to 25 mm.

Figure 3:
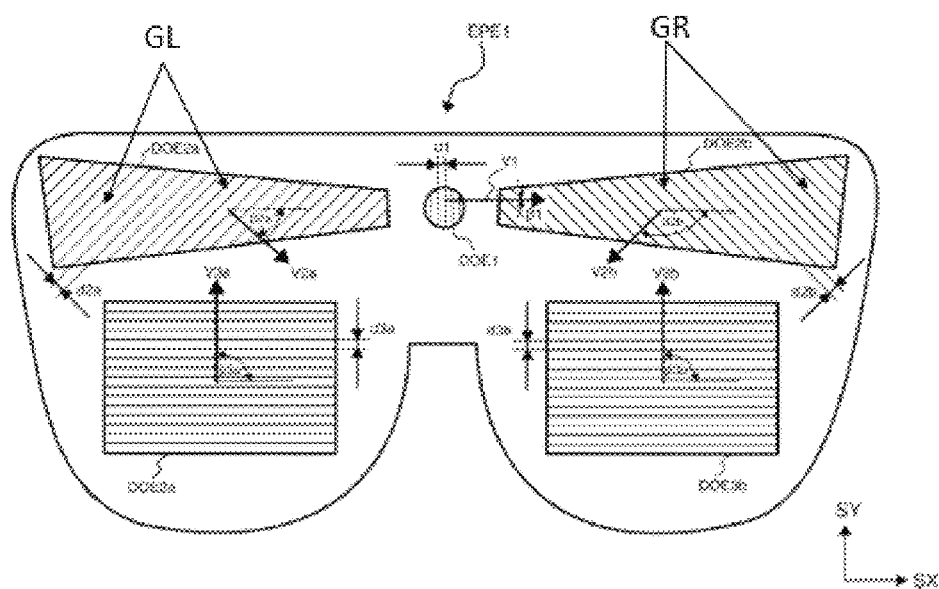
FIG. 3 is a schematic view of vector directions of the grating units of the optical device according the embodiment in FIG. 1.

FIG. 3 shows periods and directions of different grating regions of the optical device EPE1. Each unit DOE1, DOE2a, DOE2b, DOE3a, DOE3b may comprise one or more diffraction grating regions. For example, the unit DOE1 may comprise a diffraction grating region. For example, the unit DOE2a may comprise several diffraction grating sub-regions, while the grating period and direction of each sub-region remains the same. For example, the unit DOE2b may comprise several diffraction grating sub-regions, while the grating period and direction of the sub-region remains the same. For example, the unit DOE3a may comprise several diffraction grating sub-regions, while the grating period and direction of each sub-region remains the same. For example, the unit DOE3b may comprise several diffraction grating sub-regions, while the grating period and direction of each sub-region remains the same.

A grating period (d) of the diffraction grating and the orientation ($\beta$) of the diffractive features of the diffraction grating may be specified by a grating vector V of the diffraction grating. The diffraction grating comprises a plurality of diffractive features (F) which may be operated as diffractive lines. The diffractive features may be e.g. microscopic ridges or grooves. The diffractive features may also be e.g. microscopic protrusions (or recesses), wherein adjacent rows of protrusions (or recesses) may be operated as diffractive lines. The grating vector V may be defined as a vector having a direction perpendicular to the diffractive lines of the diffraction grating and a magnitude given by $2\pi/d$, where d is the grating period. The grating period means the same as the grating period length. The grating period may be the length between consecutive diffractive features of the grating, and the grating period may be equal to a unit length divided by the number of the diffractive features located within the unit length. The grating period d1a of the entrance pupil grating unit DOE1 may be e.g. in a range of 330 nm to 450 nm, and an optimal value depends on the refractive index of the plate SUB1 and on the wavelength $\lambda$ of the diffracted light.

The entrance pupil grating unit DOE1 may have a grating vector V1, the left pupil-expanding grating unit DOE2a may have a grating vector V2a, the right pupil-expanding grating unit DOE2b may have a grating vector V2b, the left exit pupil grating unit DOE3a may have a grating vector V3a, and the right exit pupil grating unit DOE3b may have a grating vector V3b.

The grating vector V1 has a direction $\beta1$ and a magnitude $2\pi/d1$, the grating vector V2a has a direction $\beta2a$ and a magnitude $2\pi/d2a$, the grating vector V2b has a direction $\beta2b$ and a magnitude $2\pi/d2b$, the grating vector V3a has a direction $\beta3a$ and a magnitude $2\pi/d3a$, and the grating vector V3b has a direction $\beta3b$ and a magnitude $2\pi/d3b$. The direction ($\beta$) of the grating vector may be defined as an angle between the vector and a reference direction (e.g. the direction SX).

The grating periods (d) and the directions ($\beta$) of the diffraction gratings of the optical units DOE1, DOE2a, DOE3a may be selected, so that the propagation direction DIR0' of the light at the center point in the output light beam OUT1 is parallel to the propagation direction DIR0 of the light at the center point in the input light IN1.

The grating periods (d) and the directions ($\beta$) of the diffraction gratings of the optical units DOE1, DOE2b, DOE3b may be selected, so that the propagation direction DIR0' of the light at the center point in the output light beam OUT2 is also parallel to the propagation direction DIR0 of the light at the center point in the input light IN1.

The direction $\beta1$ of the grating vector V1 of the entrance pupil grating unit DOE1 may be around 0 degree, e.g. −1 to 1 degree. The direction $\beta2a$ of the grating vector V2a of the left pupil-expanding grating unit DOE2a may be 30 to 60 degrees. The direction $\beta2b$ of the grating vector V2b of the right pupil-expanding grating unit DOE2b may be 120 to 150 degrees, and the grating vector V2a and the grating vector V2b are bilaterally symmetric. The direction $\beta3a$ of the grating vector V3a of the left exit pupil grating unit DOE3a may be around 90 degrees, e.g. 88 to 92 degrees. The direction $\beta3b$ of the grating vector V3b of the right exit pupil grating unit DOE3a may be around 90 degrees, e.g. 88 to 92 degrees, and the grating vector V3a and the grating vector V3b are bilaterally symmetric.

For predetermined integers m1, m2a, m2b, m3a, m3b, The grating periods (d) and the direction ($\beta$) of the grating vectors can be satisfied the condition that the vector sum (m1V1+m2aV2a+m3aV3a) is zero, and the vector sum (−m1V1+m2bV2b+m3bV3b) is zero. The value of these integers is typically +1 or −1. The value of the integers m1, m2a, m2b, m3a, m3b may be e.g. +1 or −1. Specifically, when V1 take a left direction, the vector sum of V1, V2a, and V3a is zero. When V1 take a right direction, the vector sum of V1, V2b, V3b is zero.

Figure 4:
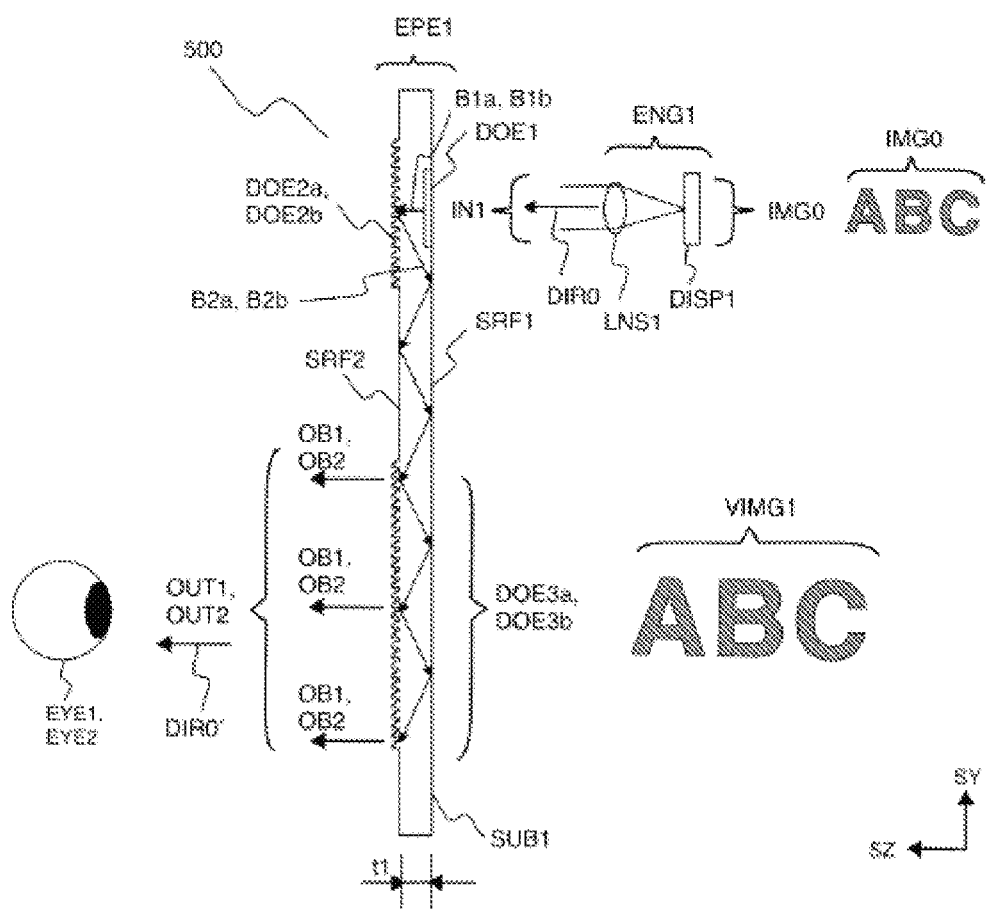
FIG. 4 is a side view of the optical device according to the embodiment in FIG. 1.

As shown in FIG. 4, the optical device EPE1 can form the output light beam OUT1 by diffracting and guiding the input light IN1 obtained from an optical engine ENG1. A display apparatus 500 may comprise the optical engine ENG1 and the optical device EPE1.

The input light IN1 may comprise a plurality of light beams propagating in different directions, and each light beam of the input light IN1 may correspond to a different point of the input image IMG0. The output light beam OUT1 and the output light beam OUT2 may comprise a plurality of light beams propagating in different directions which will enter the left eye EYE1 and the right eye EYE2, respectively. Each light beam of the output light beam OUT1 and the output light beam OUT2 may correspond to a different point of the displayed virtual image VIMG1. The pupil-expanding device EPE1 may form the left output light beam OUT1 and the right output light beam OUT2 from the input light IN1, so that the directions and the intensities of the light beams of the output light beam OUT1 correspond to the points of the input image IMG0.

The light beam of the input light IN1 may correspond to a single image point of the displayed image. The optical device EPE1 may form a left output light beam OB1 and a right output light beam OB2 in the same direction from the light beam of the input light IN1, so that the direction DIR0' of the output light beam is parallel to the direction DIR0 of the corresponding light beam of the input light IN1.

The display apparatus 500 may comprise the optical engine ENG1 to form a primary image IMG0 and to convert the primary image IMG0 into a plurality of light beams of the input light IN1. Lights of the engine ENG1 may be optically coupled from the entrance pupil grating unit DOE1 of the optical device EPE1. The input light IN1 may be optically coupled to the entrance pupil grating unit DOE1 of the optical device EPE1. The apparatus 500 may be a display device for displaying virtual images, and the apparatus 500 may also be an optical device for myopia.

The optical device EPE1 may transfer virtual image content in the light engine ENG1 to the front of user's left eye EYE1 and right eye EYE2. The optical device EPE1 can expand the pupil, thereby expanding the eye box.

The engine ENG1 may comprise a micro-display DISP1 to generate a primary image IMG0. The micro-display DISP1 may comprise a two-dimensional array of light-emitting pixels. The display DISP1 may generate, e.g. a primary image IMG0 e.g. with a resolution of 1920×1080 (Full HD). The display DISP1 may generate, e.g. a primary image IMG0 with a resolution of 1920×1080 (Full HD). The display DISP1 may generate, e.g. a primary image IMG0 with a resolution of 3840×2160 (4K UHD). The engine ENG1 may comprise collimating optics LNS1 to form a light beam different from each image pixel. The engine ENG1 may comprise the collimating optics LNS1, so that the light emitted from a certain pixel point forms a basically collimated beam, and different pixels correspond to different collimation directions.

The engine ENG1 may provide a plurality of light beams corresponding to the generated primary image IMG0. The one or more light beams provided by the engine ENG1 may be coupled to the optical EPE1 as input light IN1.

The engine ENG1 may comprise e.g. one or more light emitting diodes (LED). The display DISP1 may comprise e.g. one or more micro display imagers, such as liquid crystal on silicon (LCOS), liquid crystal display (LCD), digital micromirror device (DMD).

The waveguide plate SUB1 may have a first major surface SRF1 and a second major surface SRF2. The surfaces SRF1, SRF2 may be substantially parallel to the plane defined by the directions SX and SY The waveguide plate SUB1 may have a thickness t1. The waveguiding plate SUB1 comprises a planar waveguiding core. In an embodiment, the waveguide plate SUB1 may optionally comprise e.g. one or more cladding layers, one or more protective layers, and/or one or more mechanically supporting layers. The thickness tSUB1 may refer to a thickness of the planar waveguiding core of the waveguide plate SUB1.

A grating structure of the entrance pupil grating unit DOE1 may be arranged on the first major surface SRF1 or the second major surface SRF2 of the waveguide plate SUB1, and the first left guided light B1a and the first right guided light B1b are formed by diffracting the input light beam IN1. The input light beam IN1 can be incident from a front of the optical device EPE1 or from a back of the optical device EPE1. The first left guided light B1a and the first right guided light B1b can be propagated inside the planar waveguide plate SUB01, and the main propagation directions are symmetrical. The first left guided light B1a and the first right guided light B1b may be confined in the planar waveguide plate SUB1 for total internal reflection (Total Internal Reflection).

A grating structure of the right pupil-expanding grating unit DOE2b may be arranged on the first major surface SRF1 or the second major surface SRF2 of the waveguide plate SUB1. The left pupil-expanding grating unit DOE2a is used for receiving the first left guided light B1a, and forming the second left guided light B2a by diffracting the obtained first left guided light B1a. The left pupil-expanding grating unit DOE2a may almost evenly distribute the left second guided light B2a to the left exit pupil grating unit DOE3a, and the second left guided light B2a may be restricted to propagate in the waveguiding plate SUB01 by total internal reflection. The right pupil-expanding grating unit DOE2b is used for receiving the first right guided light B1b, and form the second right guided light B2b by diffracting the first right guided light B1b. The right pupil-expanding grating unit DOE2b may be almost evenly distribute the right second guided light B2b to the right exit pupil grating unit DOE3b. The second right guided light B2b may be restricted to propagate in the waveguide plate SUB01 by total internal reflection.

Grating structures of the left exit pupil grating unit DOE3a and the right exit pupil grating unit DOE3b may be arranged on the first major surface SRF1 or the second major surface SRF2 of the waveguide plate SUB1. The left exit pupil grating unit DOE3a may diffract the expended guided light B2a to form the left output light OB1, thus to form the left output light beam OUT1 as a whole. The directions of the left output light OB1 and the left output light beam OUT1 are called direction DIR0'. The right exit pupil grating unit DOE3b may diffract the expended guided light B2b to form the right output light OB2, thus to form the right output light beam OUT2 as a whole. The directions of the right output light OB2 and the right output light beam OUT2 are also called direction DIR0'.

The left output light beam OUT1 and the right output light beam OUT2 can enter the left eye EYE1 and the right eye EYE2, respectively. Due to the same direction of the beams, the left and right eyes can achieve binocular fusion without other additional adjustments. Due to overall left-right symmetry, the color complementarity in images of the left and right eyes can be achieved, thus to realize a better color uniformity and a larger field of view.

The waveguide plate SUB1 may comprise or consist essentially of transparent solid material. The waveguide plate SUB1 may comprise e.g. glass, polycarbonate or polymethyl methacrylate (PMMA). The diffractive optical units DOE1, DOE2a, DOE2b, DOE3a, DOE3b may be formed e.g. by molding, embossing, and/or etching. The units DOE1, DOE2a, DOE2b, DOE3a, and DOE3b may be implemented e.g. by one or more surface diffraction gratings or by one or more volume diffraction gratings.

Figure 5:
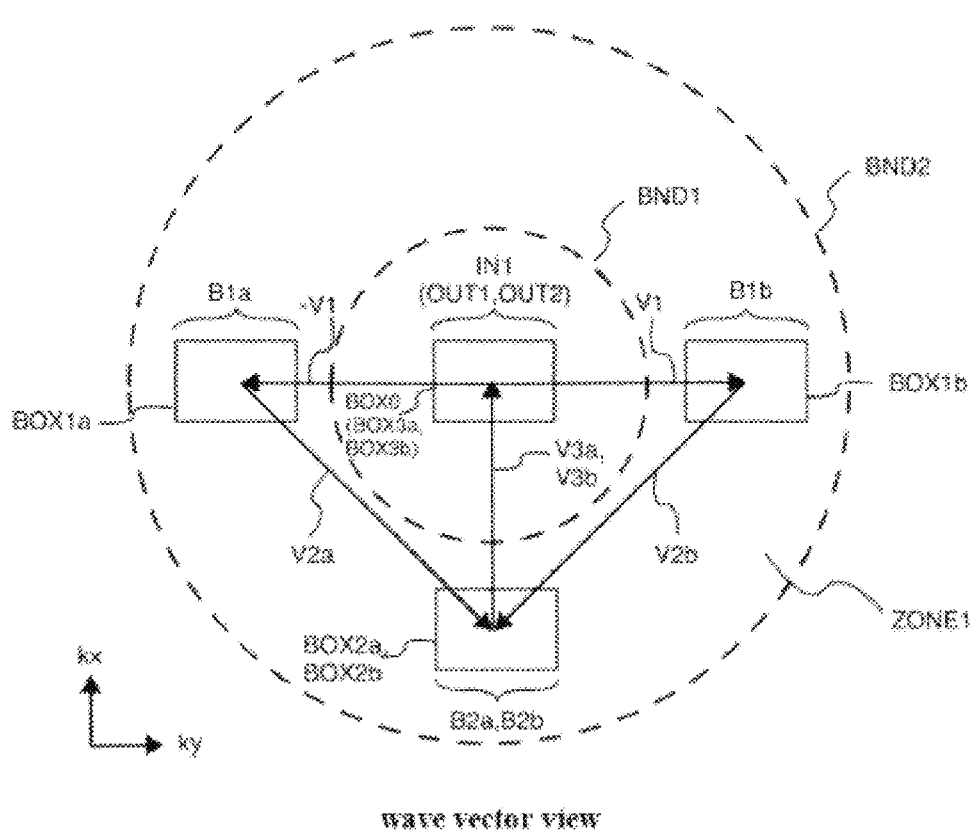
FIG. 5 is a wave vector view of light of the optical device according to the embodiment in FIG. 1.

FIG. 5 shows a wave vector view of light by example. The light of this wavelength may propagate in the waveguide plate along a left route and a right route. The wave vector of the input light IN2 may exist in a region BOX0 of the wave vector space defined by the initial wave vectors kx and ky. Each corner of the region BOX0 may represent a wave vector of the light at the corner point of the input image IMG0.

A wave vector of the first left guided light B1a may be in the region BOX1a, a wave vector of the first right guided light B1b may be in the region BOX1b, a wave vector of the second left guided light B2a may be in the region BOX2a, and a wave vector of the second right guided light B2b may be in the region BOX2b. A wave vector of the left output beam OUT1 may be in the region BOX3a, and a wave vector of the right output beam OUT2 may be in the region BOX3b.

BND1 denotes a minimum boundary for fulfilling a criterion of total internal reflection (TIR) in the waveguide plate SUB1, and BND2 denotes a maximum boundary for fulfilling a criterion of total internal reflection (TIR) in the waveguide plate SUB1, which can be determined by the refractive index of the substrate. The Light may be waveguided in the waveguide plate SUB1 only when the wave vector of the light is in the region ZONE1 between the first boundary BND1 and the second boundary BND2. The light may leak out of the waveguide plate or not be propagated at all if the wave vector of the light is outside the region ZONE1.

The grating periods (d) and the directions (β) of the diffraction gratings of the optical units DOE1, DOE2a, DOE2b, DOE3 may be selected, so that the region BOX0, region BOX3a, and region BOX3b in the wave vector space are almost overlapped. At the same time, for the wavelengths of the three colors RGB, the wave vectors of region BOX1a, region BOX1b, region BOX2a, and region BOX2b are all in the region ZONE1 defined by the boundaries BND1 and BND2. In this case, the region BOX2a and the region BOX2b in the wave vector space almost overlap.

The left route is counterclockwise. For example, the entrance pupil grating unit DOE1 can form the first left guided light B1a by diffracting the input light IN1, that is, the grating vector −m1V1 of the entrance pupil grating unit DOE1 and the wave vector of the input light IN1 are added to represent the wave vector that is diffracted into the first left guided light B1a. The wave vector of the second left guided light B2a may be determined by adding the grating vector m2aV2a to the wave vector of the first guided light B1a. Finally, the wave vector of the output light beam OUT1 may be determined by adding the grating vector m3aV3a to the wave vector of the second left guided light B2a.

The right route is counterclockwise. For example, the entrance pupil grating unit DOE1 can form the first right guided light B1b by diffracting the input light IN1, that is, the grating vector m1V1 of the entrance pupil grating unit DOE1 and the wave vector of the input light IN1 and added to present the wave vector that is diffracted into the first right guided light B1b. The wave vector of the second right guided light B2b may be determined by adding the grating vector m2bV2b to the wave vector of the first guided light B1b. Finally, the wave vector of the output light beam OUT2 may be determined by adding the grating vector m3bV3b to the wave vector of the second right guided light B2a.

The grating periods (d) and the directions (β) of the diffraction grating of the optical units DOE1, DOE2a, DOE3a, DOE2b, and DOE3b can be selected, so that an angle between the grating vector −V1 and V2a is 30° to 60°, an angle between grating the vector V1 and V2b is 120° to 150°, an angle between the grating vector V2a and V3a may be 30° to 60°, and an angle between the grating vector V2b and V3b is 30° to 60. The left route and the right route of light propagation are bilaterally symmetric.

kx denotes a direction in the wave vector space, wherein the direction kx is parallel to the direction SX of the real space. ky denotes a direction in the wave vector space, wherein the direction ky is parallel to the direction SY of the real space. The symbol kz (not shown in the Figs.) denotes a direction in the wave vector space, wherein the direction kz is parallel to the direction SZ of the real space. A wave vector k may have components in the directions kx, ky, and/or kz.

Figure 6:
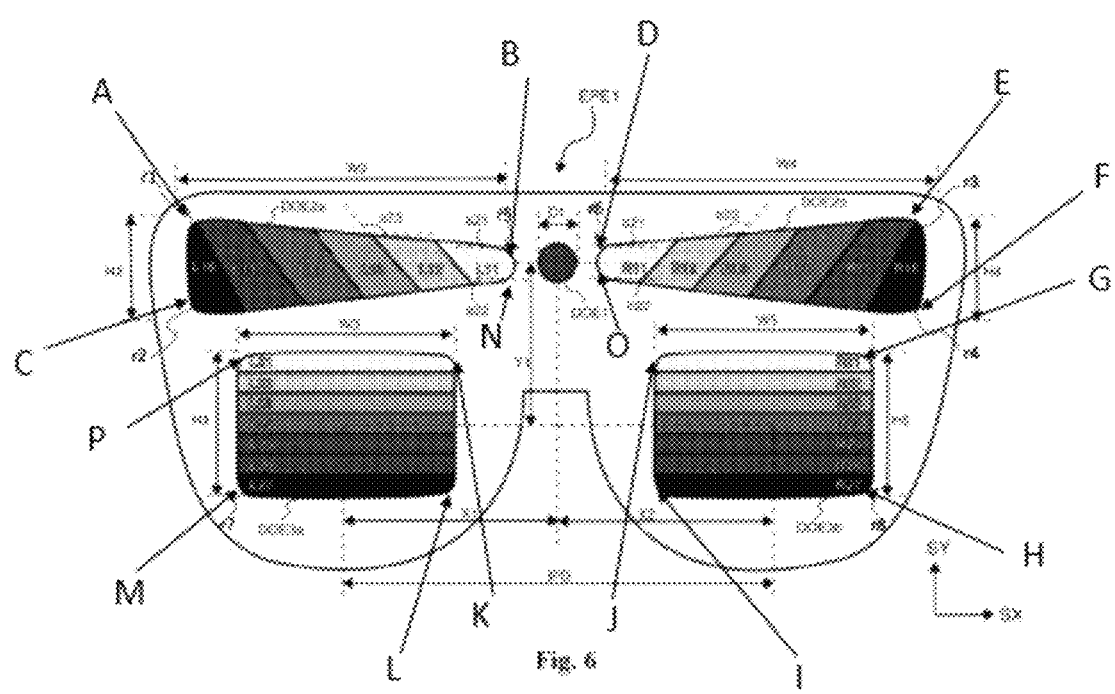
FIG. 6 is a schematic structural view of the optical device according to another embodiment of the present disclosure.

FIG. 6 shows a front view of the optical device EPE1 that the corners of the grating region may be arced or filleted (A), (B), (C), (D), (E), (F), (G), (H), (I), (J), (K), (L), (M), (N), (O), (P) to better adapt to the shape of the glasses.

In the second left pupil-expanding region DOE2a, an upper left radian is r1, a lower left radian is r2, and a right radian is r5. In the second right pupil-expanding region DOE2b, an upper right radian is r3, a lower right radian is r4, and a left radian is r6. The radian of four corners of the third left pupil-expanding region DOE3a may be r7, and the radian of four corners of the third right pupil-expanding region DOE3b may be r8, wherein the radius of curvature of all radians is in a range of 2 mm-20 mm.

The optical device of the present embodiment can divide the entrance pupil lights into a left eye and a right eye with only one light engine, improving the overall efficiency of the diffractive waveguide. By setting the gratings of the waveguide plate and controlling the binocular coupling through the precision of the glass wafer, the generation difficulty of binocular coupling is reduced and the coupling is improved. In addition, the optical symmetry of the left and right eyes may compensate each other with a better color uniformity. The integrated design of the waveguide matches with the arc shape, which is more suitable for users.

In the above description of this specification, unless otherwise clearly defined and limited, the terms "fixed", "installed", "connected" or "connected" should be interpreted in a broad sense. For example, in terms of the term "connection", it can be a fixed connection, a detachable connection, or a whole; it can be a mechanical connection or an electrical connection; it can be directly connected or indirectly connected through an intermediate medium. Or it can be the internal communication of two elements or the interaction relationship between the two elements. Therefore, unless specifically defined otherwise in this specification, those skilled in the art can understand the specific meaning of the above-mentioned terms in this application according to specific circumstances.

According to the above description of this specification, those skilled in the art can also understand the following terms used, such as "upper", "lower", "front", "rear", "left", "right", "length", "width", "thickness", "vertical", "horizontal", "top", "bottom", "inner", "outer", "axial", "radial", "circumferential", "center". The terms indicating the orientation or position relationship such as longitudinal, "horizontal", "clockwise" or "counterclockwise" are based on the orientation or position relationship shown in the drawings of this specification, which are only for the convenience of explaining the solution of the application For the purpose of simplifying the description, instead of expressly or implying that the involved device or element must have the specific orientation, be constructed and operated in the specific orientation, the above-mentioned terms of orientation or position relationship cannot be understood or interpreted as Restrictions on the proposal of this application.

In addition, the terms "first" or "second" used in this specification to refer to numbers or ordinal numbers are only for descriptive purposes, and cannot be understood as expressing or implying relative importance or implicitly indicating that the number of technical characteristics. Thus, a feature defined with "first" or "second" may explicitly or implicitly includes at least one of the features. In the description of this specification, "plurality" means at least two, such as two, three or more, etc., unless otherwise specifically defined.

Although this specification has shown and described a number of embodiments of the present application, it is obvious to those skilled in the art that such embodiments are only provided by way of example. Those skilled in the art will think of many alterations, changes and substitutions without departing from the spirit and spirit of the application. It should be understood that in the process of practicing the application, various alternatives to the embodiments of the application described herein can be adopted. The appended claims are intended to limit the protection scope of the present application, and therefore cover the module composition, equivalents or alternatives within the scope of these claims.

What is claimed is:

1. An optical device comprising a waveguide plate, wherein the waveguide plate comprises:
   an entrance pupil grating unit, wherein an input light is diffracted by the entrance pupil grating unit to form a first left guided light and a first right guided light;
   a left pupil-expanding grating unit, located on a left side in a horizontal direction of the entrance pupil grating unit, wherein the first left guided light is diffracted by the left pupil-expanding grating unit to form a second left guided light;
   a right pupil-expanding grating unit, located on a right side in the horizontal direction of the entrance pupil grating unit, wherein the first right guided light is diffracted by the right pupil-expanding grating unit to form a second right guided light;
   a left exit pupil grating unit, located below in a vertical direction of the left pupil-expanding grating unit, wherein the second left guided light is diffracted by the left exit pupil grating unit to form a left output light;
   a right exit pupil grating unit, located below in a vertical direction of the right pupil-expanding grating unit, wherein the second right guided light is diffracted by the right exit pupil grating unit to form a right output light,
   wherein the left pupil-expanding grating unit and right pupil-expanding grating unit are bilaterally symmetric about the entrance pupil grating unit, the left exit pupil grating unit and the right exit pupil grating unit are bilaterally symmetric about the entrance pupil grating unit, and the input light, the left output light, and the right output light are in a same direction, a virtual image received by a left eye and a virtual image received by a right eye are exactly same.

2. The optical device of claim 1, wherein the entrance pupil grating unit is a surface grating or a holographic grating, a shape of the entrance pupil grating unit is a circle with a diameter in a range of 2.5 mm to 7 mm, and a grating period of the entrance pupil grating unit is in the range of 330 nm to 450 nm.

3. The optical device of claim 2, wherein the left pupil-expanding grating unit and the right pupil-expanding grating unit are pupil-expanding grating structures, a height of the pupil-expanding grating structures in the vertical direction gradually increases in a direction horizontally away from the entrance pupil grating unit, a maximum height of the pupil-expanding grating structures in the vertical direction is 2 to 5 times of the diameter of the entrance pupil grating unit, and a width of the pupil-expanding grating structures in the horizontal direction is 5 to 10 times of the diameter of the entrance pupil grating unit.

4. The optical device of claim 3, wherein each of the pupil-expanding grating structure is divided into 5 to 15 pupil-expanding sub-regions, an angle between a boundary of adjacent pupil-expanding sub-regions and the horizontal direction is 20 to 160 degrees, a diffraction efficiency of each pupil-expanding sub-region gradually increases in a direction away from the entrance pupil grating unit, and the diffraction efficiency of each pupil-expanding sub-region is 5% to 95%.

5. The optical device of claim 3, wherein the left exit pupil grating unit and the right exit pupil grating unit are pupil-exiting grating structures, the pupil-exiting grating structures are in a rectangle shape, a height of the pupil-exiting grating structures in the vertical direction is 3 to 6 times of the diameter of the entrance pupil grating unit, and a width of the pupil-exiting grating structures in the horizontal direction is 80% to 95% of the width of the pupil-expanding grating structures.

6. The optical device of claim 5, wherein each of the pupil-exiting grating structure is divided into 5 to 15 pupil-exiting sub-regions, a diffraction efficiency of each pupil-exiting sub-region gradually increases in a direction vertically away from the entrance pupil grating unit, and the diffraction efficiency of each pupil-exiting sub-region is 5% to 95%.

7. The optical device of claim 5, wherein the pupil-expanding grating structures are in a quadrilateral shape, four corners of each of the pupil-expanding grating structure and four corners of each of the pupil-exiting grating structure are all filleted, and a radius of curvature thereof is 0 mm to 20 mm.

8. The optical device of claim 1, wherein a horizontal distance from a center of the left exit pupil grating unit to a center of the right exit pupil grating unit is a pupillary distance of human's eyes, and the pupillary distance is 60 mm to 70 mm, and a vertical distance from a center of the entrance pupil grating unit to the center of the left exit pupil grating unit is 8 mm to 25 mm.

9. The optical device of claim 1, wherein taking a direction from left to right as a reference, a direction of a grating vector of the entrance pupil grating unit is −1 to 1 degree, a direction of a grating vector of the left pupil-expanding grating unit is 30 to 60 degrees, a direction of a grating vector of the right pupil-expanding grating unit is 120 to 150 degrees, a direction of a grating vector of the left exit pupil grating unit is 88 to 92 degrees, and a direction of a grating vector of the right exit pupil grating unit is 88 to 92 degrees.

10. The optical device of claim 9, wherein when the grating vector of the entrance pupil grating unit is in a left direction, a sum of grating vectors of the entrance pupil grating unit, the left pupil-expanding grating unit, and the left exit pupil grating unit is zero; when the grating vector of the entrance pupil grating unit is in a right direction, a sum of grating vectors of the entrance pupil grating unit, the right pupil-expanding grating unit and the right exit pupil grating unit is zero.

11. A display apparatus comprising an optical engine and the optical device according to claim 1, wherein the optical engine provides the input light.

* * * * *